United States Patent
Yeh

(10) Patent No.: US 12,168,820 B2
(45) Date of Patent: Dec. 17, 2024

(54) HIGH STRENGTH AND CORROSION RESISTANT FERROCHROME ALLOY BULK AND ARTICLE COMPRISING THE SAME

(71) Applicant: National Tsing Hua University, Hsinchu (TW)

(72) Inventor: Jien-Wei Yeh, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 24 days.

(21) Appl. No.: 17/385,990

(22) Filed: Jul. 27, 2021

(65) Prior Publication Data

US 2023/0002868 A1    Jan. 5, 2023

(30) Foreign Application Priority Data

Jun. 30, 2021    (TW) .................................. 110124028

(51) Int. Cl.
C22C 35/00    (2006.01)
C22C 1/03    (2006.01)

(52) U.S. Cl.
CPC .............. *C22C 35/005* (2013.01); *C22C 1/03* (2013.01)

(58) Field of Classification Search
CPC ................................ C22C 35/005; C22C 1/03
See application file for complete search history.

(56) References Cited

U.S. PATENT DOCUMENTS

| 10,265,767 B2 | 4/2019 | Sawada | |
| 2004/0258554 A1* | 12/2004 | Radon | C22C 30/00 420/12 |
| 2016/0168670 A1* | 6/2016 | Cheney | C22C 38/28 420/64 |
| 2016/0346837 A1* | 12/2016 | Sawada | C22C 38/24 |

FOREIGN PATENT DOCUMENTS

| CN | 101255557 A | * | 9/2008 |
| WO | 03060174 A1 | | 7/2003 |

OTHER PUBLICATIONS

Magmaweld; webpage: https://www.magmaweld.com/hardness-conversion-table/i/79; accessed Sep. 8, 2022 (Year: 2022).*
Liu et al., "Microstructure and wear behavior of (Cr,Fe)7C3 reinforced composite coating produced by plasma transferred arc weld-surfacing process"; Surface & Coatings Technology 201, 2006, pp. 863-867 (Year: 2006).*
CN-101255557-A: Espacenet English machine translation (Year: 2008).*
Magmaweld (NPL; webpage: https://www.magmaweld.com/hardness-conversion-table/i/79; accessed Sep. 8, 2022; see webpage/NPL attached with Sep. 16, 2022 office action) (Year: 2022).*

* cited by examiner

*Primary Examiner* — Adil A. Siddiqui
(74) *Attorney, Agent, or Firm* — ANOVA LAW GROUP, PLLC

(57) ABSTRACT

A high strength and corrosion resistant ferrochrome alloy bulk is disclosed, which comprises, in weight percent: 30-68% Cr, 1.5-8% Ni, 1.6-6% C, and the balance Fe and incidental impurities, of which a Fe/Ni ratio is in a range from 5 to 10 and a Cr/C ratio is in a range between 10 and 33. Experimental data reveal that, samples of the high strength and corrosion resistant ferrochrome alloy bulk all possess hardness above HV400 and excellent corrosion resistance due to the high content of Cr. As a result, experimental data have proved that the high-strength and corrosion-resistant ferrochrome alloy bulk of the present invention has a significant potential to replace conventional high-strength stainless steels, so as to be widely applied in various industrial fields, e.g., aviation, transportation, marine facility components, chemical equipment and pipe fittings, engine parts, turbine blades, valves, bearings, building materials, and so on.

3 Claims, No Drawings

HIGH STRENGTH AND CORROSION RESISTANT FERROCHROME ALLOY BULK AND ARTICLE COMPRISING THE SAME

BACKGROUND OF THE INVENTION

1. Field of the Invention

The present invention relates to the technology field of alloy materials, and more particularly to a high strength and corrosion resistant ferrochrome alloy bulk and article comprising the same.

2. Description of the Prior Art

Stainless steel is an iron alloy composed primarily of iron and chromium, of which chromium imparts good corrosion resistance through the formation of a thin layer of chromium oxide on the surface of the stainless steel. Therefore, stainless steel is highly durable and impervious to rust, thereby being widely applied in various industry fields. Nowadays, there are more than 230 types of stainless steels purchasable on the market, of which about 50 types are used regularly, and they are further classified into 5 series of austenitic, martensitic, ferritic, precipitation hardening (PH), and duplex.

For satisfying the demands of aerospace (e.g., turbine blades) and marine engineering (e.g., marine facility components) for special use stainless steels (SUS), governments turned extensive financial and other resources to technological research of the special use stainless steels since 1940, and especially to the development and manufacture of austenitic stainless steels, martensitic stainless steels, and precipitation hardening (PH) stainless steels.

As described in more detail below, the most frequently used SUS301 and SUS304 are two types of austenitic stainless steel, wherein SUS301 has a lower chromium (16-18 wt %) and nickel (6-8 wt %) content than that of SU304 (18-20 wt % Cr, 8-10.5 wt % Ni). Although it is allowable to further enhance the hardness of an austenitic stainless steel by cold working, a reachable maximum hardness of the austenitic stainless steel is merely HV500. In addition, it is worth mentioning that, SUS301 commonly exhibits a corrosion resistance inferior to that of SUS304 because of its low chromium content.

On the other hand, martensitic stainless steel, composed primarily of iron, 12-17% chromium and up to 1.2% carbon, is a type of stainless steel that is known for its strength, corrosion resistance, and durability. Moreover, martensitic stainless steels are hardenable by heat treatments like tempering and/or quenching. The martensitic stainless steels' final performance is greatly dependent on the austenization treatment, and their different properties such as hardness, wear resistance and corrosion resistance are determined by the quenched microstructure formed therein. Therefore, it is very important to precisely control the austenization process during manufacture of the martensitic stainless steels. For example, SUS440 is one type of martensitic stainless steel having hardness up to HV800. However, due to their low chromium content (12-17%), there is still room for improvement in the conventional martensitic stainless steels' corrosion resistance performance.

As far as alloy material engineers know, precipitation hardening (PH) stainless steels are composed primarily of iron, chromium, nickel, and at least one additive element that is selected from the group consisting of Cu, Al, Mo, Ti, and Nb, thereby achieving precipitation hardening by aging the stainless steels with the aforesaid additions. For example, SUS630 is one type of PH stainless steel having microstructure consisting of martensite phase and nanoscale precipitation of Cu—Ni compound. Moreover, SUS630 has a hardness in a range from HV290 to HV380 according to different temper symbols.

In conclusion, the conventional austenitic and martensitic stainless steels still need to be further strengthened on their corrosion resistance performance in spite of possessing outstanding hardness. On the other hand, although PH stainless steels are able to exhibit outstanding corrosion resistance, their hardness performance, which is inferior to that of the conventional austenitic and martensitic stainless steels, still needs to be further improved because of their low carbon content.

According to the above descriptions, it is understood that how to develop a specific alloy material both having high strength and excellent corrosion resistance therefore becomes an important issue for the alloy material manufacturers. In view of that, inventors of the present invention have made great efforts to make inventive research and eventually provided a high strength and corrosion resistant ferrochrome alloy bulk and article comprising the same.

SUMMARY OF THE INVENTION

The primary objective of the present invention is to disclose a high strength and corrosion resistant ferrochrome alloy bulk produced by sequentially applying a melting process and a solidification process to a virgin material. The high strength and corrosion resistant ferrochrome alloy bulk comprises, in weight percent: 30-68% Cr, 1.5-8% Ni, 1.6-6% C, and the balance Fe and incidental impurities, of which a Fe/Ni ratio is in a range from 5 to 10 and a Cr/C ratio is in a range between 10 and 33. Experimental data reveal that, samples of the high strength and corrosion resistant ferrochrome alloy bulk all possess hardness above HV400 and excellent corrosion resistance due to the high content of Cr. As a result, experimental data have proved that the high-strength and corrosion-resistant ferrochrome alloy bulk of the present invention has a significant potential to replace conventional high-strength stainless steels, so as to be widely applied in various industrial fields, e.g., aviation, transportation, marine facility components, chemical equipment and pipe fittings, engine parts, turbine blades, valves, bearings, building materials, sports equipment and so on.

For achieving the primary objective, the present invention discloses a first embodiment of the high strength and corrosion resistant ferrochrome alloy bulk, which is made by sequentially applying a melting process and a solidification process to a virgin material, has a hardness greater than HV400, and comprises, in weight percent:
  30-68% Cr;
  1.5-8% Ni;
  1.6-6% C; and
  the balance Fe and incidental impurities;
  wherein a Fe/Ni ratio is in a range from 5 to 10, and a Cr/C ratio being in a range between 10 and 33.

Moreover, the present invention further discloses a second embodiment of the high strength and corrosion resistant ferrochrome alloy bulk, which is made by sequentially applying a melting process and a solidification process to a virgin material, has a hardness greater than HV400, and comprises, in weight percent:
  30-68% Cr;
  1.5-8% Ni;
  1.6-6% C;

up to 5% M, wherein M comprises at least one additive element that is selected from a group consisting of B, Al, Si, Sn, Ti, V, Mn, Co, Cu, Zr, Nb, Mo, Ta, and W; and the balance Fe and incidental impurities;

wherein a Fe/Ni ratio is in a range from 5 to 10, and a Cr/C ratio being in a range between 10 and 33; and wherein in case of M including Si, a content of Si being smaller or equal to 1.5%.

In practicable embodiments, the high strength and corrosion resistant ferrochrome alloy bulk can be produced by using a manufacturing method selected from a group consisting of: vacuum arc melting process, electric resistance wire heating process, rapid solidification process, mechanical alloying method in combination with spark plasma sintering process, and powder metallurgic method.

In practicable embodiments, the high strength and corrosion resistant ferrochrome alloy bulk can be disposed on a surface of a work piece by using a process selected from a group consisting of casting process, electric-arc welding process, laser welding process, plasma-arc welding process, thermal spraying process, 3D additive manufacturing process, mechanical process, and chemical process.

In practicable embodiments, the high strength and corrosion resistant ferrochrome alloy bulk can be processed to be in an as-cast state, or being in a heat-treated state after being applied with a heat treatment that is selected from a group consisting of precipitation hardening treatment, annealing treatment and homogenization treatment.

In addition, the present invention also discloses an article, which is made of the high strength and corrosion resistant ferrochrome alloy bulk according to the present invention, e.g., aviation, transportation, marine facility components, chemical equipment and pipe fittings, engine parts, turbine blades, valves, bearings, building materials, and so on.

DETAILED DESCRIPTION OF THE PREFERRED EMBODIMENTS

To more clearly describe a high strength and corrosion resistant ferrochrome alloy bulk, embodiments of the present invention will be described in detail with reference to the attached drawings hereinafter.

First Embodiment

In the first embodiment, the high strength and corrosion resistant ferrochrome alloy bulk is made by sequentially applying a melting process and a solidification process to a virgin material, and has a hardness greater than HV400. According to the present invention, the high strength and corrosion resistant ferrochrome alloy bulk comprises, in weight percent: 30-68% Cr, 1.5-8% Ni, 1.6-6% C, and the balance Fe and incidental impurities, of which a Fe/Ni ratio is in a range from 5 to 10, and a Cr/C ratio being in a range between 10 and 33.

Second Embodiment

In the second embodiment, the high strength and corrosion resistant ferrochrome alloy bulk is also made by sequentially applying a melting process and a solidification process to a virgin material, and has a hardness greater than HV400. According to the present invention, the high strength and corrosion resistant ferrochrome alloy bulk comprises, in weight percent: 30-68% Cr, 1.5-8% Ni, 1.6-6% C, up to 5% M, and the balance Fe and incidental impurities, of which a Fe/Ni ratio is in a range from 5 to 10, and a Cr/C ratio being in a range between 10 and 33. As described in more detail, the forgoing M comprises at least one additive element that is selected from a group consisting of B, Al, Si, Sn, Ti, V, Mn, Co, Cu, Zr, Nb, Mo, Ta, and W. Moreover, in case of M including Si, a content of Si is smaller or equal to 1.5%.

When conducting the manufacture of the high strength and corrosion resistant ferrochrome alloy bulk, it is allowable to produce the high strength and corrosion resistant ferrochrome alloy bulk by using any one possible manufacturing method, for example, vacuum arc melting process, electric resistance wire heating process, rapid solidification process, mechanical alloying method in combination with spark plasma sintering process, and powder metallurgic method. It is worth mentioning that, how to utilize the mechanical alloying method in combination with the spark plasma sintering process to carry out the manufacture of a specific alloy has been taught in the disclosures of China Patent Publication No. CN106167870A. Moreover, it is also allowable to further process the high strength and corrosion resistant ferrochrome alloy bulk to be in an as-cast state, or to make the high strength and corrosion resistant ferrochrome alloy bulk be in a heat-treated state by utilizing a heat treatment, such as precipitation hardening treatment, annealing treatment and homogenization treatment during the manufacture of the high strength and corrosion resistant ferrochrome alloy bulk.

On the other hand, in practical applications, the high strength and corrosion resistant ferrochrome alloy bulk can be disposed on a surface of a work piece by using a suitable process, for example, casting process, electric-arc welding process, laser welding process, plasma-arc welding process, thermal spraying process, 3D additive manufacturing process, mechanical process, and chemical process.

Specifically speaking, the high-strength and corrosion-resistant ferrochrome alloy bulk of the present invention is developed to replace conventional high-strength stainless steels, so as to be widely applied in various industrial fields, e.g., aviation, transportation, marine facility components, chemical equipment and pipe fittings, engine parts, turbine blades, valves, bearings, building materials, and so on.

It is worth mentioning that, the inventor of the present invention has completed experiments in order to prove that the high strength and corrosion resistant ferrochrome alloy bulk according to the present invention can indeed be made.

First Experiment

In the first experiment, 7 samples of the high strength and corrosion resistant ferrochrome alloy bulk according to the present invention are fabricated by vacuum arc melting process. The following table (1) lists each sample's elemental composition. Moreover, homogenization process and hardness measurement for the 7 samples are also completed.

TABLE 1

| Sample | Fe (wt %) | Cr (wt %) | Ni (wt %) | C (wt %) | M (wt %) | Fe/Ni | Cr/C | Hardness (HV) |
|---|---|---|---|---|---|---|---|---|
| A1 | 24.3 | 67.1 | 2.6 | 6.0 |  | 9.35 | 11.18 | 797 |
| A2 | 23.0 | 67.1 | 2.6 | 6.0 | Ti:1.3 | 8.85 | 11.18 | 820 |
| A3 | 23.0 | 67.1 | 2.6 | 6.0 | Al:1.3 | 8.85 | 11.18 | 780 |
| A4 | 21.7 | 67.1 | 2.6 | 6.0 | Ti:1.3, Al:1.3 | 8.35 | 11.18 | 834 |
| A5 | 20.3 | 67.1 | 2.6 | 6.0 | Al:2.0 Ti:2.0 | 7.81 | 11.18 | 850 |
| A6 | 20.3 | 67.1 | 2.6 | 6.0 | Al:4.0 | 7.81 | 11.18 | 760 |
| A7 | 20.3 | 67.1 | 2.6 | 6.0 | Ti:4.0 | 7.81 | 11.18 | 910 |

According to the above Table (1), the 7 samples of the high strength and corrosion resistant ferrochrome alloy bulk all composed primarily of Fe, Cr, Ni, and C, and all have hardness greater than HV750. It is worth explaining that, carbon can improve the hardness and wear resistance of the ferrochrome alloy bulk by solution strengthening and precipitation strengthening which is realized by the formation of carbides during tempering. On the other hand, chromium imparts good corrosion resistance through the formation of a thin layer of chromium oxide on the surface of the ferrochrome alloy bulk.

Moreover, from the forgoing Table (1), it is easy to find that, the 7 samples have included the first embodiment and the second embodiment of the high strength and corrosion resistant ferrochrome alloy bulk. The most important thing is that the 7 samples of the high strength and corrosion resistant ferrochrome alloy bulk all possess the property of hardness greater than HV400.

Second Experiment

In the second experiment, 54 samples of the high strength and corrosion resistant ferrochrome alloy bulk according to the present invention are fabricated by vacuum arc melting process. The following tables (2)-(8) lists each sample's elemental composition. Moreover, homogenization process and hardness measurement for the 54 samples are also completed.

TABLE 2

| Sample | Fe (wt %) | Cr (wt %) | Ni (wt %) | C (wt %) | M (wt %) | Fe/Ni | Cr/C | Hardness (HV) |
|---|---|---|---|---|---|---|---|---|
| B1 | 31.9 | 59.5 | 3.5 | 5.1 |  | 9.11 | 11.67 | 791 |
| B2 | 30.0 | 59.5 | 3.5 | 5.1 | B:1.9 | 8.57 | 11.67 | 970 |
| B3 | 30.9 | 59.5 | 3.5 | 5.1 | Si:1.0 | 8.83 | 11.67 | 802 |
| B4 | 30.0 | 59.5 | 3.5 | 5.1 | Sn:1.9 | 8.57 | 11.67 | 785 |
| B5 | 29.9 | 59.5 | 3.5 | 5.1 | Si:1.0, Sn:1.0 | 8.54 | 11.67 | 803 |
| B6 | 28.1 | 59.5 | 3.5 | 5.1 | B:1.4, Si:1.4, Sn:1.0 | 8.03 | 11.67 | 941 |
| B7 | 27.9 | 59.5 | 3.5 | 5.1 | B:4.4 | 7.97 | 11.67 | 980 |
| B8 | 31.3 | 59.5 | 3.5 | 5.1 | Si:1.0 | 8.94 | 11.67 | 912 |
| B9 | 27.9 | 59.5 | 3.5 | 5.1 | Sn:4.4 | 7.97 | 11.67 | 820 |

TABLE 3

| Sample | Fe (wt %) | Cr (wt %) | Ni (wt %) | C (wt %) | M (wt %) | Fe/Ni | Cr/C | Hardness (HV) |
|---|---|---|---|---|---|---|---|---|
| C1 | 39.3 | 52.2 | 4.3 | 4.2 |  | 9.14 | 12.43 | 726 |
| C2 | 37.5 | 52.2 | 4.3 | 4.2 | V:1.8 | 8.72 | 12.43 | 843 |
| C3 | 37.5 | 52.2 | 4.3 | 4.2 | Mn:1.8 | 8.72 | 12.43 | 713 |
| C4 | 37.5 | 52.2 | 4.3 | 4.2 | Co:1.8 | 8.72 | 12.43 | 720 |
| C5 | 35.7 | 52.2 | 4.3 | 4.2 | V:1.8, Mn:1.8 | 8.30 | 12.43 | 838 |
| C6 | 34.8 | 52.2 | 4.3 | 4.2 | V:1.4, Mn:1.5, Co:1.6 | 8.09 | 12.43 | 794 |
| C7 | 34.8 | 52.2 | 4.3 | 4.2 | V:4.5 | 8.09 | 12.43 | 902 |
| C8 | 34.8 | 52.2 | 4.3 | 4.2 | Mn:4.5 | 8.09 | 12.43 | 703 |
| C9 | 34.8 | 52.2 | 4.3 | 4.2 | Co:4.5 | 8.09 | 12.43 | 732 |

TABLE 4

| Sample | Fe (wt %) | Cr (wt %) | Ni (wt %) | C (wt %) | M (wt %) | Fe/Ni | Cr/C | Hardness (HV) |
|---|---|---|---|---|---|---|---|---|
| D1 | 46.7 | 45.0 | 5.0 | 3.3 | | 9.34 | 13.64 | 540 |
| D2 | 45.0 | 45.0 | 5.0 | 3.3 | Cu:1.7 | 9.00 | 13.64 | 530 |
| D3 | 45.0 | 45.0 | 5.0 | 3.3 | Zr:1.7 | 9.00 | 13.64 | 580 |
| D4 | 45.0 | 45.0 | 5.0 | 3.3 | Nb:1.7 | 9.00 | 13.64 | 575 |
| D5 | 43.3 | 45.0 | 5.0 | 3.3 | Cu:1.7 Nb:1.7 | 8.66 | 13.64 | 568 |
| D6 | 42.6 | 45.0 | 5.0 | 3.3 | Cu:1.0, Zr:1.3, Nb:1.8 | 8.52 | 13.64 | 620 |
| D7 | 42.6 | 45.0 | 5.0 | 3.3 | Cu:4.1 | 8.52 | 13.64 | 480 |
| D8 | 42.6 | 45.0 | 5.0 | 3.3 | Zr:4.1 | 8.52 | 13.64 | 643 |
| D9 | 42.6 | 45.0 | 5.0 | 3.3 | Nb:4.1 | 8.52 | 13.64 | 671 |

TABLE 5

| Sample | Fe (wt %) | Cr (wt %) | Ni (wt %) | C (wt %) | M (wt %) | Fe/Ni | Cr/C | Hardness (HV) |
|---|---|---|---|---|---|---|---|---|
| E1 | 53.8 | 38.0 | 5.8 | 2.4 | | 9.28 | 15.83 | 599 |
| E2 | 53.0 | 38.0 | 5.8 | 2.4 | Mo:0.8 | 9.14 | 15.83 | 573 |
| E3 | 53.0 | 38.0 | 5.8 | 2.4 | Ta:0.8 | 9.14 | 15.83 | 623 |
| E4 | 53.0 | 38.0 | 5.8 | 2.4 | W:0.8 | 9.14 | 15.83 | 605 |
| E5 | 50.2 | 38.0 | 5.8 | 2.4 | Mo:1.8 Ta:1.8 | 8.66 | 15.83 | 670 |
| E6 | 49.4 | 38.0 | 5.8 | 2.4 | Mo:1.8 Ta:1.8, W:0.8 | 8.52 | 15.83 | 694 |
| E7 | 49.4 | 38.0 | 5.8 | 2.4 | Mo:4.4 | 8.52 | 15.83 | 635 |
| E8 | 49.4 | 38.0 | 5.8 | 2.4 | Ta:4.4 | 8.52 | 15.83 | 714 |
| E9 | 49.4 | 38.0 | 5.8 | 2.4 | W:4.4 | 8.52 | 15.83 | 706 |

TABLE 6

| Sample | Fe (wt %) | Cr (wt %) | Ni (wt %) | C (wt %) | M (wt %) | Fe/Ni | Cr/C | Hardness (HV) |
|---|---|---|---|---|---|---|---|---|
| F1 | 60.7 | 31.2 | 6.5 | 1.6 | | 9.34 | 19.50 | 415 |
| F2 | 59.2 | 31.2 | 6.5 | 1.6 | Cu:1.5 | 9.11 | 19.50 | 402 |
| F3 | 59.2 | 31.2 | 6.5 | 1.6 | Zr:1.5 | 9.11 | 19.50 | 440 |
| F4 | 59.2 | 31.2 | 6.5 | 1.6 | Nb:1.5 | 9.11 | 19.50 | 460 |
| F5 | 57.7 | 31.2 | 6.5 | 1.6 | Cu:1.5 Zr:1.5 | 8.88 | 19.50 | 435 |
| F6 | 56.2 | 31.2 | 6.5 | 1.6 | Cu:1.5, Zr:1.5, Nb:1.5 | 8.65 | 19.50 | 473 |

TABLE 7

| Sample | Fe (wt %) | Cr (wt %) | Ni (wt %) | C (wt %) | M (wt %) | Fe/Ni | Cr/C | Hardness (HV) |
|---|---|---|---|---|---|---|---|---|
| G1 | 50.7 | 41.2 | 6.5 | 1.6 | | 7.80 | 25.75 | 452 |
| G2 | 49.4 | 41.2 | 6.5 | 1.6 | V:1.5 | 7.60 | 25.75 | 523 |
| G3 | 49.4 | 41.2 | 6.5 | 1.6 | Mn:1.5 | 7.60 | 25.75 | 463 |
| G4 | 49.4 | 41.2 | 6.5 | 1.6 | Co:1.5 | 7.60 | 25.75 | 470 |
| G5 | 47.7 | 41.2 | 6.5 | 1.6 | Mn:1.5, Co:1.5 | 7.34 | 25.75 | 486 |
| G6 | 46.2 | 41.2 | 6.5 | 1.6 | V:1.5, Mn:1.5, Co:1.5 | 7.11 | 25.75 | 530 |

TABLE 8

| Sample | Fe (wt %) | Cr (wt %) | Ni (wt %) | C (wt %) | M (wt %) | Fe/Ni | Cr/C | Hardness (HV) |
|---|---|---|---|---|---|---|---|---|
| H1 | 40.7 | 51.2 | 6.5 | 1.6 |  | 6.26 | 32.00 | 523 |
| H2 | 39.1 | 51.2 | 6.5 | 1.6 | B:1.6 | 6.02 | 32.00 | 613 |
| H3 | 39.7 | 51.2 | 6.5 | 1.6 | Si:1.0 | 6.11 | 32.00 | 582 |
| H4 | 39.1 | 51.2 | 6.5 | 1.6 | Sn:1.6 | 6.02 | 32.00 | 511 |
| H5 | 37.7 | 51.2 | 6.5 | 1.6 | Si: 1.4, Sn:1.6 | 5.80 | 32.00 | 574 |
| H6 | 36.1 | 51.2 | 6.5 | 1.6 | B:1.6, Si: 1.4, Sn:1.6 | 5.55 | 32.00 | 653 |

According to the above Tables (2)-(8), the 54 samples have included the first embodiment and the second embodiment of the high strength and corrosion resistant ferrochrome alloy bulk. The most important thing is that the 54 samples of the high strength and corrosion resistant ferrochrome alloy bulk all possess the property of hardness greater than HV400.

In consequence, experimental data reveal that samples of the high strength and corrosion resistant ferrochrome alloy bulk all possess hardness above HV400 and excellent corrosion resistance due to the high content of Cr. Therefore, experimental data have proved that the high-strength and corrosion-resistant ferrochrome alloy bulk of the present invention has a significant potential to replace conventional high-strength stainless steels, so as to be widely applied in various industrial fields, e.g., aviation, transportation, marine facility components, chemical equipment and pipe fittings, engine parts, turbine blades, valves, bearings, building materials, sports equipment and so on.

Through above descriptions, all embodiments and related experimental data of the high strength and corrosion resistant ferrochrome alloy bulk according to the present invention have been introduced completely and clearly. However, the embodiments are not intended to limit the scope of the present invention, and all equivalent implementations or alterations within the spirit of the present invention still fall within the scope of the present invention.

What is claimed is:

1. A high strength and corrosion resistant ferrochrome alloy bulk, being made by sequentially applying a melting process of raw materials in a crucible and a solidification process to cast as an ingot, so as to have a hardness greater than HV400 but lower than HV900; wherein the high strength and corrosion resistant ferrochrome alloy bulk consists of, in weight percent:
    39-68% Cr;
    2.5-5.5% Ni;
    2.5-6% C;
    at most 4.5% M; and
    the balance Fe;
    wherein M consists of at least one additive element that is selected from a group consisting of B, Al, Si, Sn, Ti, V, Mn, Co, Cu, Zr, Nb, and Mo, and a summation of B, AL, Si, Sn, Ti, V, Mn, Co, Cu, Zr, Nb, and Mo content is less than or equal to 4,5%;
    wherein a Fe/Ni ratio is in a range from 6 to 10, and a Cr/C ratio being in a range between 10 and 20; and
    wherein in case of M including Si, a content of Si being smaller or equal to 1.5%.

2. The high strength and corrosion resistant ferrochrome alloy bulk of claim 1, being processed to be in an as-cast state, or being in a heat-treated state after being applied with a heat treatment that is selected from a group consisting of precipitation hardening treatment, annealing treatment and homogenization treatment.

3. An article, being made of a high strength and corrosion resistant ferrochrome alloy bulk, wherein the high strength and corrosion resistant ferrochrome alloy bulk is made by sequentially applying a melting process of raw materials in a crucible and a solidification process to cast as an ingot, so as to have a hardness greater than HV400 but lower than HV900; wherein the high strength and corrosion resistant ferrochrome alloy bulk consists of, in weight percent:
    39-68% Cr;
    2.5-5.5% Ni;
    2.5-6% C;
    at most 4.5% M; and
    the balance Fe;
    wherein M consists of at least one additive element that is selected from a group consisting of B, Al, Si, Sn, Ti, V, Mn, Co, Cu, Zr, Nb, and Mo, and a summation of B, Al, Si, Sn, Ti, V, Mn, Co, Cu, Zr, Nb, and Mo content is less than or equal to 4.5%;
    wherein a Fe/Ni ratio is in a range from 6 to 10, and a Cr/C ratio being in a range between 10 and 20; and
    wherein in case of M including Si, a content of Si being smaller or equal to 1.5%.

* * * * *